INVENTOR
J. E. COX
BY
Phillip A. Weiss
ATTORNEY

Aug. 25, 1970 J. E. COX 3,525,814

ORIGINATING REGISTER CONTROL SWITCHING SYSTEM WITH OPTIMUM-ROUTING NETWORK STATUS PROGRAMMING

Filed Dec. 27, 1965 4 Sheets-Sheet 2

Aug. 25, 1970 J. E. COX 3,525,814

ORIGINATING REGISTER CONTROL SWITCHING SYSTEM WITH OPTIMUM-ROUTING NETWORK STATUS PROGRAMMING

Filed Dec. 27, 1965 4 Sheets-Sheet 3

3,525,814

ORIGINATING REGISTER CONTROL SWITCHING SYSTEM WITH OPTIMUM-ROUTING NETWORK STATUS PROGRAMMING

John Edward Cox, 482 Grace Ave., Garfield, N.J. 07026

Filed Dec. 27, 1965, Ser. No. 516,223
Int. Cl. H04q 3/56
U.S. Cl. 179—18 17 Claims

ABSTRACT OF THE DISCLOSURE

This invention relates to an originating register controlled switching system wherein the originating register is controlled by translated programmed information. The program operates on network status information to select an optimum route. The programmed information is continually updated by status information received from other nodal points in the network. Under the control of the program, the selection of any but the preferred (optimum) route is inhibited.

This invention relates to communication switching networks and more particularly, to switching networks that are controlled by programmed originating registers.

Switching networks function to extend communication paths selected from among a plurality of alternate paths between geographically separated switching centers. In most communication networks, the information required to direct a call is temporarily stored in a register-sender at the originating office. At the instructions of common control equipment, communications are established between the originating office and a tandem switching center. The conventional originating register-sender then transmits all of the information it stores to the tandem center and releases from the connection thereby erasing the memory of the called destination number at the originating office. The technique requiring transmission of all stored information is herein called "transfer forward." If the call can not thereafter be completed from the tandem center to another switching center, the stored information has been lost to the originating office and the call is blocked and has to be reoriginated at another time.

In most long distance communications networks, there is this statistical chance of a call being blocked due to insufficient trunking. In these networks, no account is generally taken of the fact that the blocked call might have been completed if a different choice of initial route has been made. For example, a call starting out from Washington and destined for San Francisco may choose a route via Chicago and find a blocking condition from Chicago to San Francisco, whereas, if the initial choice had been made to St. Louis the call might have found a free path to San Francisco out of St. Louis and thereby have been completed. Ordinarily, such blocked calls are lost and have to be reoriginated since the memory of the destination of the call is normally erased at Washington before the blocking condition is discovered at Chicago.

In addition to losing the stored directing information, the technique of "transfer forward" when applied to symmetrical networks enables a detrimental "ring around the rosy" closed loop communication path to be established. That is, by continually passing the control of the call routing to successive nodal points, a choice of a route by a center could route the call back to an earlier center, through which the call has already passed. It is conceivable that under these random choice conditions all of the available trunks in a closed loop between tandem offices could be busied with a single call.

Normally, this problem is avoided by structuring the long distance network in a hierarchical manner rather than a symmetrical manner. Also restrictive rules are applied to the alternate routing procedures to prevent closed loops from being formed. For example, it is conventional to restrict the paths to other offices of the same or lower echelon in the hierarchy to only that traffic which terminates directly in those offices, even though these trunks could provide alternate tandem paths to other more remote offices. Also, it is conventional to arrange the equipment so that if the direct path to the terminal office is busy all traffic uses a common route to the next higher echelon office and control of the call is passed on to the higher echelon center. These conventional hierarchical systems can be engineered to provide an acceptable grade of service (percentage of lost calls) as long as the traffic pattern can be fairly closely predicted. However, as soon as the traffic deviates sharply from the normal pattern, due to emergencies or national holidays, these conventional systems suffer from an undue loss of calls.

A symmetrically connected network, having no restriction on alternate routing allows the completion of many more calls under abnormal conditions due to its inherent "self healing" effect of spreading the abnormal traffic evenly over the whole network, thereby minimizing the congestion at any one point in the network at the expense of a slightly decreased grade of service to all traffic rather than a catastrophic loss of traffic at the abnormally congested nodal points. As long as a free path exists through the symmetrical network, calls may be completed using the symmetrical network, provided a means is devised to control the alternate routing choices to avoid closed loops which become possible with the conventional "transfer forward" technique of control.

However, if massive destruction occurs in a network, even if it is symmetrical, the resulting traffic demand pattern may be no abnormal as to severly overload the remaining part of the network beyond a threshold of tolerance. Under these conditions, if essential communications such as Federal Government, fire, police, civil defense traffic are to get through, it is necessary to impose a selective system of restrictions to the routing permitted to each class of traffic within the symmetrical network.

For example, non-essential traffic may be denied all long distance calls or may be denied long distance calls in a direction which will encounter or increase congestion in the network, whereas the essential traffic is allowed free choice fo any surviving direction.

An originating register control technique, wherein the register at the originating office maintains complete control of the setting up of the call through successive offices by an exploratory method of successively trying each possible path until a successful attempt is made avoids the interim loss of the directory signals and the closed loop "ring around the rosy" condition. However, this method of retention of control by any one register would use an inordinately long time for establishing a call—especially if the call is processed by following a normal random search procedure.

Accordingly, it is an object of this invention to provide new and unique originating register controlled switching networks, which will permit the control of symmetrical trunking networks under all conditions of network outage or abnormal traffic conditions and also provide for speedy selection of the optimum choice of alternate route.

A related object of the invention is to provide switching networks having an originating common control that is completely cognizant of virtually all conditions existing throughout the network. Thus, the originating register may be directed to use the best available route with little or no "hunting."

A further object of the invention is to provide an originating register control switching network serving different classes of calls wherein certain classes have a preference priority over other classes.

Another object of the invention is to provide a switching network that will monitor its own traffic and equipment status and broadcast this status information to other switching centers throughout the network.

A related object is the making available of this information on a time interval basis for periodic recording to provide the basis for studies of traffic behavioral patterns within the network.

Still another object of the invention is to provide originating register circuitry for sending specific routing information to a succeeding switching center to inform that succeeding center about the exact route that it should use for extending further connections.

Thus the originating switching center controls the choice of routing at all other centers that the call may traverse on its way to its destination. The order in which these possible routes are chosen is hereinafter referred to as the program for the originating register control. The program is stored at the originating center.

A related object is the provision of a program for the originating register.

A related object is to provide in the program for the selection of routes based upon the bandwidth required by traffic or any other peculiarities of the traffic. This includes the selective insertion of digital regenerative devices into a route when required.

Yet another object of the invention is to provide a communication system which will survive a partial destruction of the transmission facilities used by such system. More specifically, an object is to provide for the selection of the best available route with retrial of other routes if the selected route cannot be used. As long as a route exists in the network, the register controlled by this invention will find it. Furthermore, an object is to return traffic to a normal pattern when the facilities again become available.

A further object of the invention is to speed up the setting up of calls over long distance networks by reducing the holding time of register equipment at tandem or intermediate offices, thereby reducing the amount of equipment necessary to provide this function. As described below this object is achieved by only sending forward the minimum information necessary to select a path through an intermediate center. The full directory number stored at the outgoing register is never sent forward.

A more particular object of the invention is to provide a communication switching network capable of automatic alternate routing under the control of the originating register augmented by a trunk status control over route selection and by means for selectively restricting certain routes.

A further object of the invention is the design of a system of direct switching of data subsets which contains sufficient safeguards to permit unattended operation of the subsets.

In keeping with one aspect of the invention, these and other objects are accomplished through the use of register equipment controlled by translated programmed information. The program operates on network status information to select an optimum route. The programmed information is continually updated by status information received from other nodal points in the network. Under the control of the program, the selection of any but the preferred (optimum) route is inhibited.

Safeguards against misrouting calls due to faulty network status information are included. If, for example, due to a malfunction of the status reporting system after having embarked upon the preferred route, it is discovered that the preferred route in reality is blocked; then, since the originating register has retained control, it cancels the original route preference and embarks upon the establishment of the next best available alternate route in the program. This process repeats until all programmed routes have been tried. Thus, the best available route is selected in a manner that uses the minimum equipment in the most reliable manner.

The above mentioned and other features and objects of this invention and the manner of obtaining them will become more apparent and the invention itself will be best understood by reference to the following description of an embodiment of the invention taken in conjunction with the accompanying drawings, in which.

Figures 1, 2:
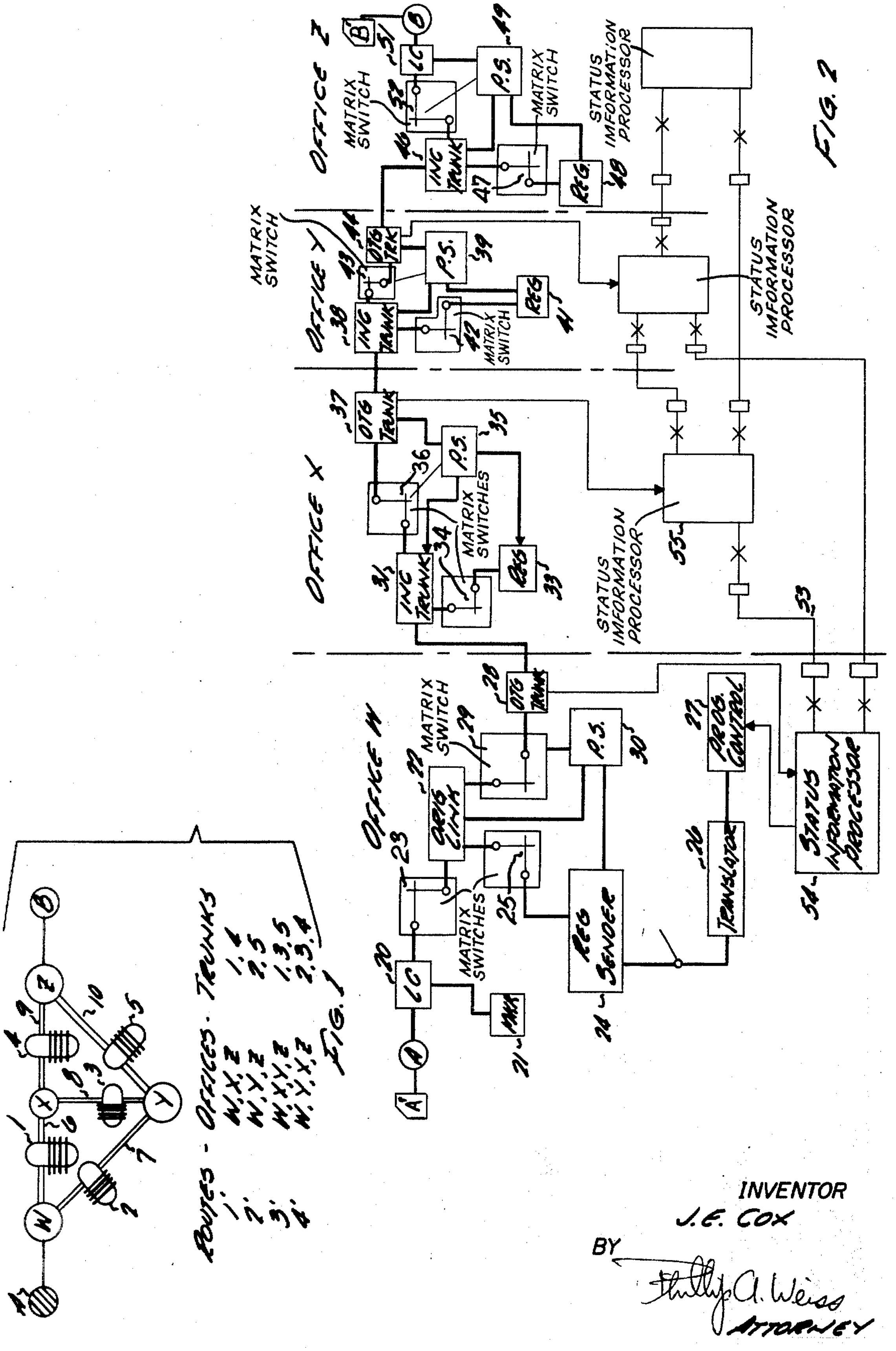
FIG. 1 shows part of a national switching network comprising a plurality of tandem offices connected together in a symmetrical network.
FIG. 2 shows, in block diagram form, one path connected through the switching network.
Figure 3:
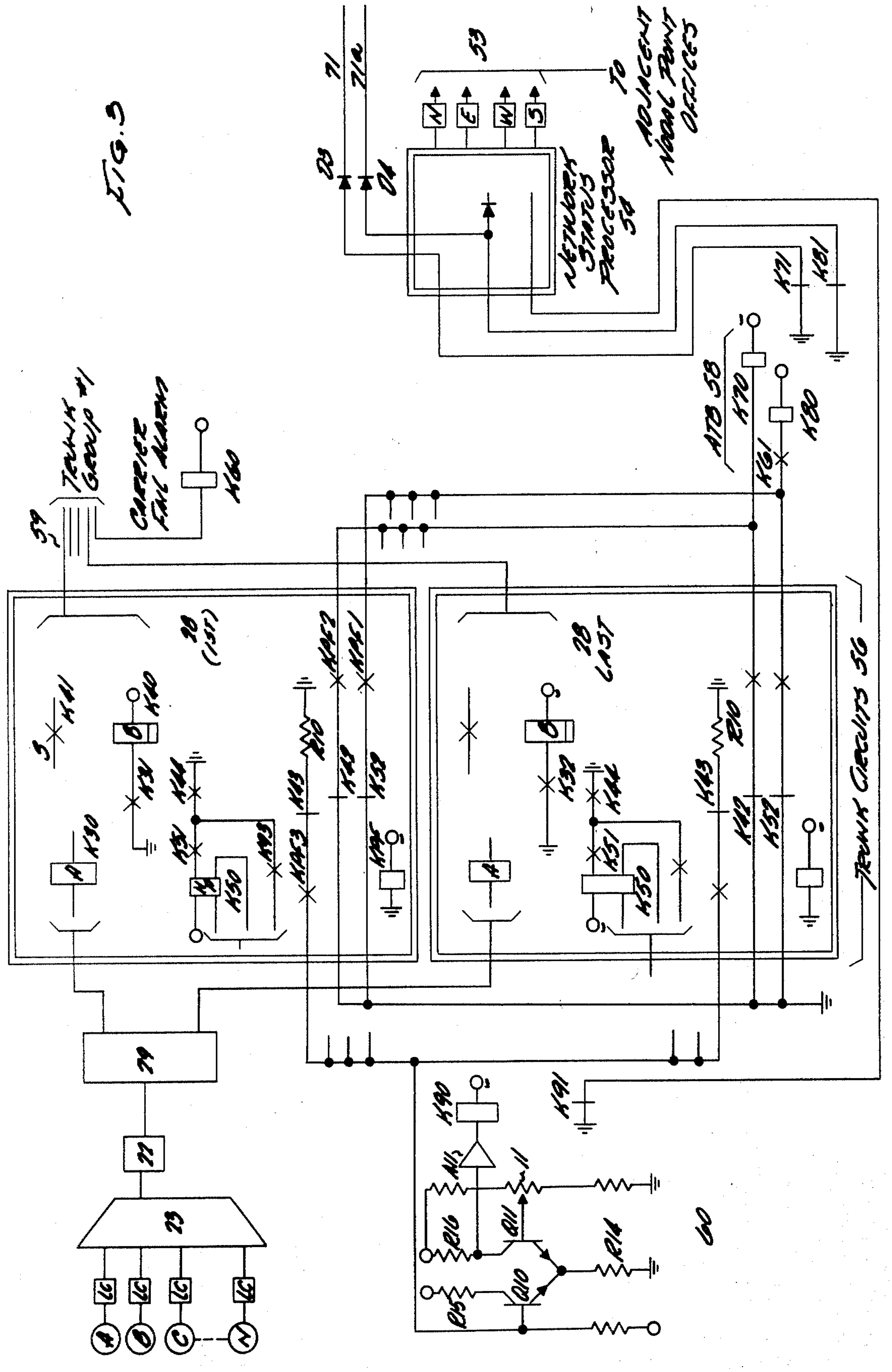
Figures 4, 6:
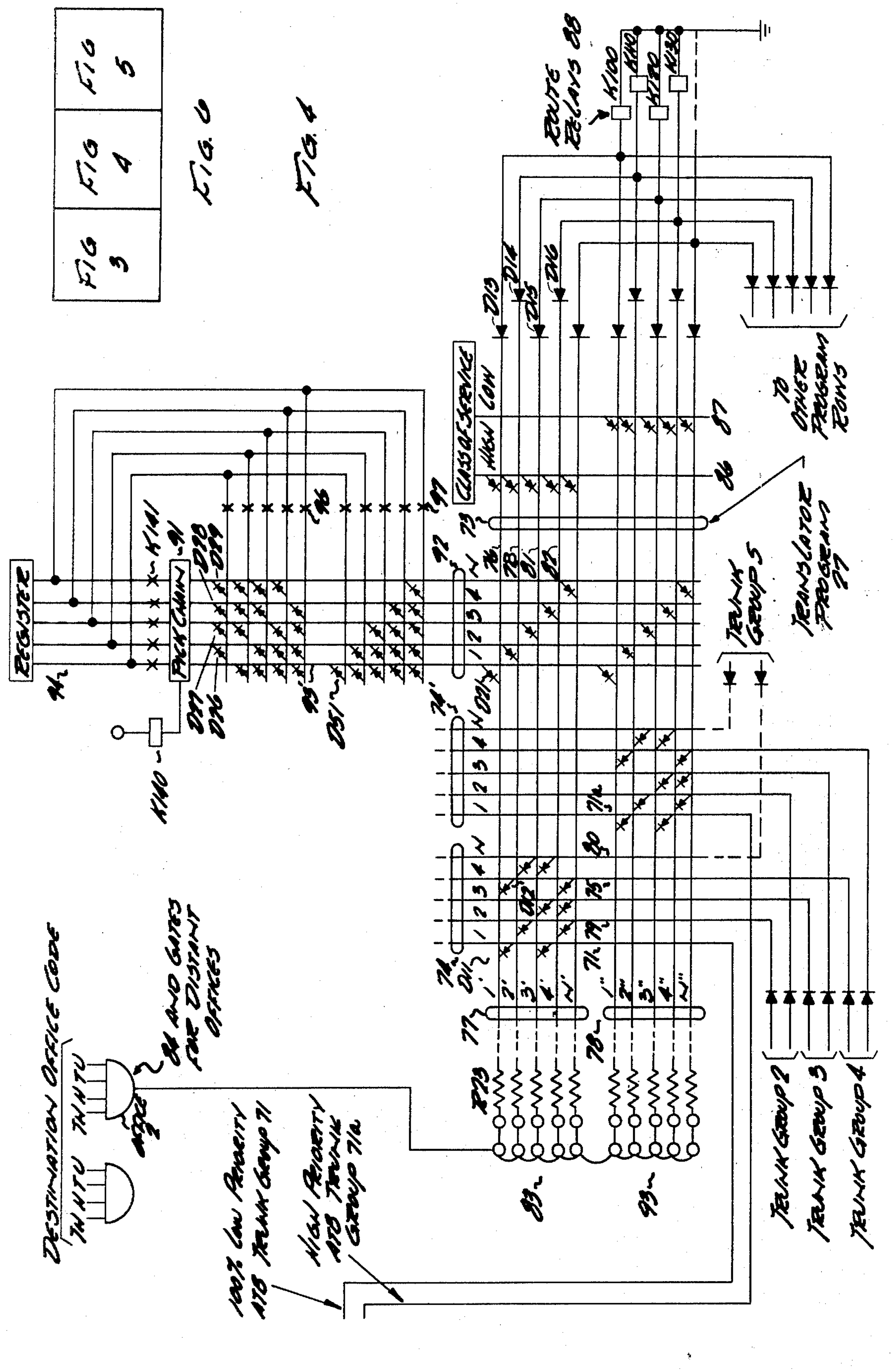
Figure 5:
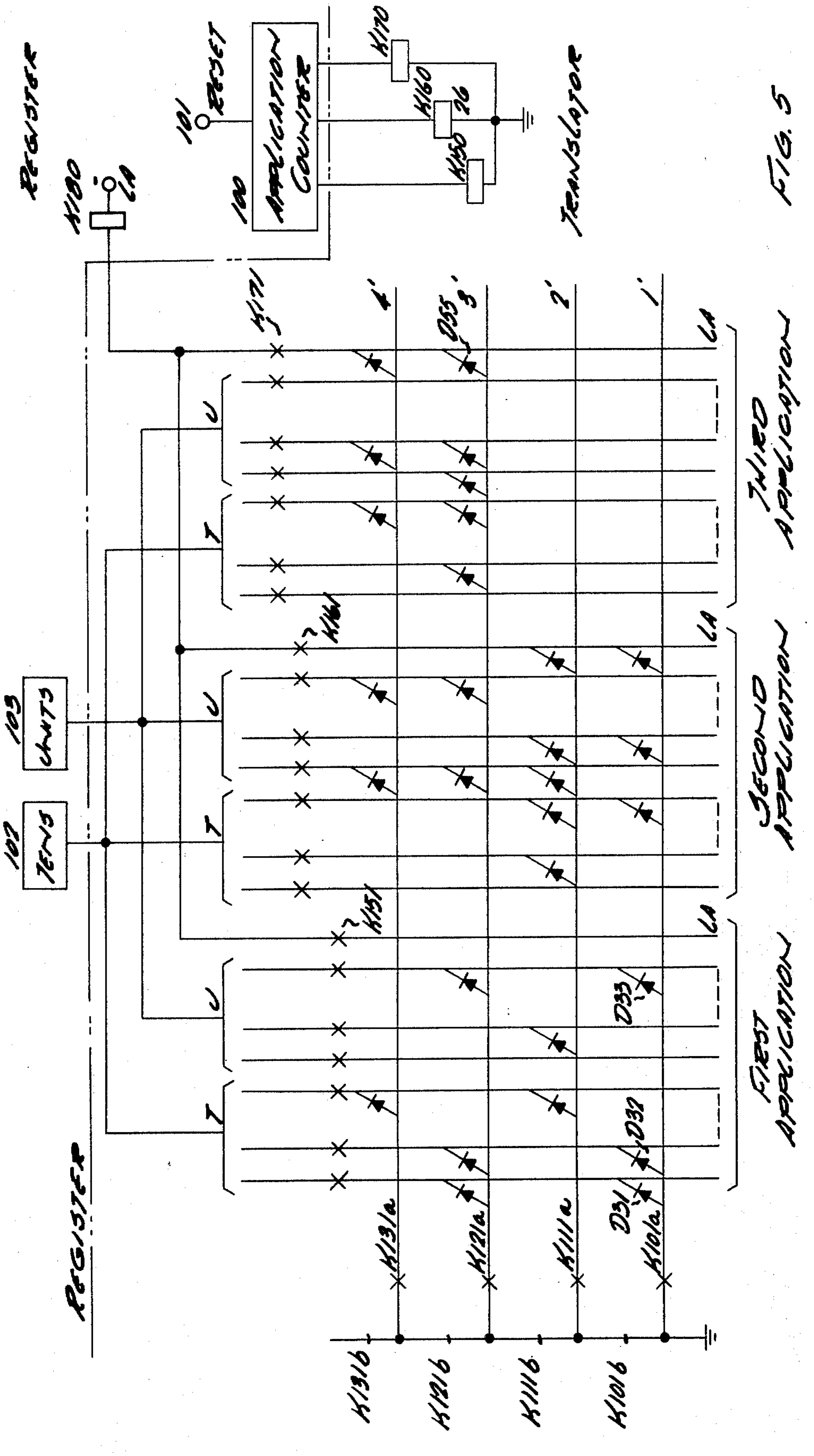

FIG. 3 schematically shows the trunk circuits associated with an office in the switching network;

FIGS. 4 and 5 schematically show the circuit details of various blocks of FIG. 2 that are required to carry out the invention;

FIG. 6 shows how FIGS. 3, 4 and 5 should be joined to provide an overall schematic diagram of the system.

FIG. 1 shows in simplified form a portion of a national switching network. The portion of the network shown here includes two end stations A, B and four central offices or switching centers W, X, Y and Z. It is assumed that the stations A, B are the end points of a desired communication route through the network. The communication route may be extended over tandem connected ones of the four central offices or switching stations. For example, heavily inked lines represent trunk groups 1–5 and are shown as interconnecting central offices W, X, Y and Z. Each of the trunk groups includes a plurality of trunk lines, as indicated by the short lines, as at 1. Arbitrarily, the drawing has been made to show the four possible valid routes (1'–4') between stations A and B, as depicted in FIG. 1. It should be noted that any other chosen route will contain a closed loop (i.e. W, X, Y, W, X, Z) which must be denied.

As shown in the table of FIG. 1, the shortest, most desirable, and primary or preferred route 1' includes offices W, X, Z and trunk groups 1, 4. The next most desirable route (first alternate route 2') includes offices W, Y, Z and trunk groups 2, 5. A third route (second alternate route 3') includes offices W, X, Y, Z and trunk groups 1, 3, 5. A fourth route (third alternate route 4') includes W, Y, X, Z and trunk groups 2, 3, 4. Of course, the network may be made as large or as small as required to serve an area need—this layout is exemplary only.

In addition to the heavily inked trunk lines, FIG. 1 shows, by means of lightly inked lines 6, 7, 8, 9 and 10, a status information transmittal network joining the central offices. This status information network may transmit over wire lines, through the air, by radio or in any other suitable manner. At each office, the status assessment network gathers information about the availability of local equipment. This information is sent over the lightly inked lines to each other office to which it is connected.

When received at a distant office, the information is stored for use by the originating register program and is combined with locally derived information about the availability of local trunk plant and sent on to other offices to which it is connected.

The information may be sent cyclically or periodically, or it may be sent on demand by a distant center or it may be sent whenever a change in status is detected or any suitable combination of these methods.

Care is taken in the sending of the information to process it so as to suppress false information by making comparison checks at the office monitoring the particular trunk group in question.

Whenever information received is the same as that stored the further transmission of the information message is suppressed. Whenever information received from a distant center contains incorrect information about the status of local trunk groups at the receiving center it is an indication that false information has been stored at one or more distant centers and a corrective broadcast is immediately sent by the receiving center to all centers to which it is connected.

It can thus be seen that the information about the network status propagates through the network in a similar manner to ripples on the surface of a pool, spreading outward with a finite time delay from a point of disturbance. It can also be seen that by the closed nature of the network and its ability to check, compare, repeat, or suppress status messages; the status system is error correcting and non-oscillatory. Thus, each office always has up-to-date information regarding the availability of equipment at every other office.

A finite time delay always occurs before a distant center information store is updated. This time delay is accounted for in this invention, as described below, in such a manner as to provide an adjustable statistical chance of more than one call simultaneously racing for the last available trunk in a group. (A call blocked in this manner is known as a "pocketed" call.) It should be noted that "pocketed" calls are not lost with the system described in this invention.

For any trunk group to be unavailable to a call, all of the trunk lines associated therewith must also be unavailable. When using conventional "transfer forward" type of register control, in a system such as illustrated in FIG. 1, a call might end up by busying out all of the trunk lines in any given closed loop. Thus, it is possible with the transfer forward system that a connection may be initiated over a selected route, encounter an all trunks busy condition, direct itself through alternate tandem offices by free choice of route at each nodal point and then return to the originating office. At the originating office, the path may find another idle trunk line extending to the first tandem office and repeat the process continuously until all idle trunks in the closed loop have been used up and made busy in a "ring around the rosy" manner. (W, X, Y, W, X, Y, W . . . ).

This is possible because the route Y, W, X, Z is a perfectly valid route for a call originating at Y and terminating in Z and, with the transfer forward system in conventional use, switching center W has no way of recognizing where the incoming call originated.

In greater detail, suppose that a call originating at station A is directed to station B. The call may begin by being extended to office X over one of the trunk lines of trunk group No. 1. At office X, the call may find that all trunk lines of trunk group No. 4 are busy. Consequently, the call may be extended to office Y over an available line of trunk group No. 3. Similarly, at office Y the call may find that all trunk lines of trunk group No. 5 are busy. Since center Y has free choice and has no knowledge that the call originated at center W, the call may be extended over an idle line of trunk group No. 2 to originating office W. At office W, the call may find another idle trunk line in trunk group No. 1 so that the process repeats itself. All idle trunk lines in the closed loop comprising offices W, X, Y may be made busy by a single call. The inventive network described herein is precluded from going into such a closed loop condition. This is accomplished by providing a programmed originating register control system which:

(a) Maintains control of the call through all tandem centers.

(b) Informs each successive center in the set-up of a call of the only direction by which the call must leave that office.

(c) Does not permit free choice of routes to subsequent tandem centers.

(d) Excludes closed loop paths from its control program.

It should be noted that, with the invention described, if a closed loop path is written into the program then the inventive system will complete the closed loop. The purpose of the invention is to preclude random choice at successive centers and to exclude closed loop paths by not including them as part of a controlled program.

In accordance with this invention, the originating register such as the register in office W retains control over the call. All alternate route selections are made under the control of a single program in the originating office. This program precludes closed loop conditions. Thus, for example, the register in office W sends a request to the register at office X for a trunk in group No. 4.

If a free trunk in group No. 4 is selected, the register in office Z will return a "go" signal through office X to the office W register. On the other hand, if no trunks are available in group No. 4, the register at office X returns a "no go" signal.

Regardless of the signal returned, the originating register in office W does not in general outpulse and erase all of its stored supervisory signals, but retains them to make another try over an alternate route, if necessary. If a "no-go" or busy signal is returned from the register in office X, an alternate route is attempted—in this example, over trunk group No. 2. On the other hand, if a "go" signal is returned from the register in office Z, the originating register sends the directory number signals required to reach the next succeeding office or the terminating line in office Z as the case may be. The register at office X is dropped immediately after the successful trunk selection or after returning of the "no-go" signal to office W.

This operation is repeated at every tandem office until either the call is cut through or every alternative trunk group has been explored and the connection can not be completed. No closed loop busy conditions are possible since none are programmed into the originating register. Nor can the call be lost since the originating register retains the necessary information until the call is cut-through, and the originating register is released.

The originating office monitors the call as it is set up office by office. When a connection is completed from a calling to a called station, the monitor gives a signal. This way, at unattended machines the calling and called stations may "talk" to each other during times when no human is present.

For example, FIG. 2 shows two unattended teleprinters A′ and B′ at stations A and B respectively. The teleprinter A′ could contain a clock controlled, stored directory number for calling station B. Then, during a period of low traffic density, unattended teleprinter A′ may place a call to unattended teleprinter B′. The originating register and its associated equipment sets up the connection in the above described manner. While the call is being set up, the calling office monitors the establishment of the connection. When the connection is completed, the monitor signals the calling teleprinter A′. Then the calling teleprinter A′ sends its stored data to teleprinter B′ at a high rate of speed. For example, it could read out a perforated or magnetic tape. After the data transmission is completed, the calling teleprinter A′ releases the connection.

The use of the network status information is to reduce the number of explorations necessary to complete a call (preferably to one per call) by the optimum selection of a route with a high chance of success at the first attempt and to avoid exploring routes which have sections wherein all trunks are busy.

It can be readily seen that, in the face of the complete absence or failure of distant trunks status reports, the invention will still complete calls, although at a slower rate.

The extension of a typical call through the network of FIG. 1 will be explained in conjunction with FIG. 2 which shows how station A may be connected through four offices W, X, Y and Z to station B. According to the table of FIG. 1, this is route 3′. Again, the trunks are shown in heavily inked lines and the status information network is shown in lightly inked lines. It should also be apparent that the connection was not accomplished over the preferred route 1′ but instead over the second alternate, i.e. over alternate route 3′. Only the basic equipment necessary for illustrating the invention are shown in these four offices. Those skilled in the art will readily perceive how this equipment works with other known equipment.

Each office shows an incoming and an outgoing trunk interconnected by a switching matrix. The matrix is controlled by a path selector which also controls the connection of a register to the incoming trunk through a register access matrix. The originating register is served by a translator which includes a program. The program is shown as connected to the network status information circuit.

Because an alternate route 3′ is used to effect the communication path, it is apparent from an inspection of FIG. 1 that trunk groups No. 2 and No. 4 are unavailable. The reasons why these trunk groups are unavailable is irrelevant—it could be either because of persisting saturated busy conditions or catastrophic failure conditions. The important thing is that the information concerning their nonavailability has been communicated to the program to cause the alternate trunk groups Nos. 3 and 5 to be shown as available.

Also, it is important to this description that information received over the status channel network has indicated to the program in advance of placing the call, the availability of trunk groups 3 and 5.

By using FIG. 2, the actual call will now be traced from station A to station B. The line circuit 20 associated with station A gives a demand for service signal such as an off-hook responsive condition.

By well known techniques, the off hook signal is detected by a marker 21 and is used to control the connection of the calling line to an originating link circuit 22 via a concentrating matrix 23.

The marker circuit also connects the link circuit 22 to a register-sender 24 via a register access matrix 25. In other cases, the line circuit 20 and concentrating matrix 23 may be remotely located in a shubdistrict concentrator or satellite exchange. In this case, the circuit 22 is an incoming trunk circuit and not an originating link.

It is important to note that the register receives a signal from the marker to indicate that this is an originating call. This signal informs the register to assume the originating mode of operation rather than a transit mode. As described below, registers in other centers will assume a transit mode of operation.

The register 24 also receives the line circuit class of service signals from the marker 21 corresponding to that stored in program against the calling line identity.

Register-sender 24 includes the originating register which controls the complete extension of the connection from the calling station A to the called station B. The called number information is obtained when the calling station dial, or other signalling device, is manipulated to store digits of the distant parties address in the register-sender 24.

The register-sender 24 then requests the services of translator 26 and presents thereto the digits representing the calling line circuit class-of-service and the remote office code. The translator decodes the address and class-of-service and presents them to the program 27. The program uses the information derived from these sources and from the trunk status memory store to select an optimum route to the destination office.

The program 27 is set to cause the call to be extended over the highest preference route then available.

When a route has been selected the memory of the route chosen is returned to the originating register by the translator for temporary storage during the setting up of the call. In this case, the chosen route is completely identified by the destination office code Z plus the information 3′.

Also the program causes the read back to the register, via the translator, of the first piece of routing information. This is that information necessary to indicate the direction by which the call should leave the originating office W. In this case, it is a digit *s* indicating that a free trunk 28 in group 1 should be selected. This information is known as the "First Application" information. The absence of a "Last Application" signal in this part of the program, indicates to the originating register that, as soon as a free trunk 28 has been selected by the register-path selector interface, the register should return to the translator for information to send to the next office.

The register uses a counter circuit to keep track of the number of times it goes to the translator and on *each* application (including the 1st) the register informs the translator of the application number.

Under normal operation, the register also returns to the translator on second and subsequent applications a set of signals indicating the identity (Route Signature) of the route chosen on the prior application. (Destination office code Z plus Route Signature 3′).

If, by any abnormal operation, the register is unable to obtain a free trunk in a group chosen, the register returns to the translator and indicates this fact by sending signals indicating the route signature and FIRST application. This signal combination causes the translation to automatically advance to the next higher available route signature and causes a signal to be sent to the register to erase the memory of the unsuccessful attempt 3′. The program would then start on the first application of the new chosen route.

In this way, if a chosen route fails to be completed for some reason, the next alternative routes in the program are successively explored in order (FIG. 1) until all programmed routes have been tried.

If all routes are not available the translator program so signals the register which causes the trunk or link circuit, such as link circuit 22, to take appropriate action for a lost call in well known manner (e.g. busy tone).

It is important to note that the call cannot be denied until all routes have been tried.

The program also uses the class-of-service information to control or restrict the selection of routes and the selection of low or high priority programs. The program also informs the register of the type of inter-office signalling that must be used. The program-translator 26, 27 may be of the type described in a co-pending patent application entitled "Routing Translator," Ser. No. 456,300, filed May 17, 1965 by George L. Hasser and assigned to the assignee of this invention.

The program 27 causes the networks to explore the alternate routes in a preferred order. Thus, a preferred route is approached and if a busy or other block condition is encountered in a chosen route, in spite of its selection by the program, the originating register is arranged to release the forward connection.

The switch path drops back and the next preferred route is explored as explained above. The process continues until either the desired path is completed or all allowed routes have been explored. The exploration techniques guarantees the integrity of the search over every allowed route which has been programmed into the translator and the search is completed in the order of the program. The program acts as a safeguard against incorrect information stored in the status memory by reason of a malfunction of the memory or status information channels.

Means are provided for speeding the exploration process. Prior art networks use a transfer forward technique, wherein, the entire directory number of a called station is transmitted at once. The tandem office which receives this entire number completes its necessary switching function and then retransmits the entire directory number to the the next tandem office. This technique is repeated at every tandem office until the call is completed. If conditions of unavailability are encountered, the call is lost. It is necessary to retransmit all directory numbers from the subscriber to the first switching center in a newly originated call in order to attempt another completion.

Furthermore, there is no guarantee that the call will attempt an alternate route and thus the call may be lost a second time, even though it would have been completed if the originating office had tried an alternate route.

For example, if the blockage was caused in the second or subsequent office, the first office in the conventional technique only considers the availability of trunks to the second office and, as long as a free trunk exists in this group, it will route calls in this direction, regardless of subsequent blockage.

This invention avoids the conventional technique and yet is compatible with it. Instead, the entire directory number remains stored in the originating register-sender 24 in office W during the switching process until the destination subscriber is reached. The originating register nondestructively reads out to the path selector the digit or digits which are necessary to reach a first office, here the office X. After the first office completes its switching function by selecting trunk 28, the originating register transmits to transit mode register 33 only the next digit or digits necessary to extend the call from office X to office Y. Thus, if a busy or otherwise path unavailable condition is encountered in office X, the originating register merely releases the connection to office X and, in conjunction with the translator program as explained above proceeds to select the succeeding programmed path without any action required on the part of the subscriber. Meanwhile, the first path is released. Thus, the invention forwards digits with provisions for dropping back and reforwarding, as distinguished from a "transfer forward" technique. It should also be noted that the number of digits sent to register 33 is considerably less than the full directory number.

Outgoing trunk circuit 28 is connected over a trunk line in trunk group No. 1 to incoming trunk circuit 31. Responsive to a calling signal the distant end trunk circuit is connected through register access matrix 34 to an idle register 33 under the control of path selector 35 by well known techniques.

It is important to note that the path selector derives a signal from trunk 31 identity to indicate to the register 33 that the call is a transit call (not originating) and thus causes the register to assume the transit mode of operation as described below.

The register 33 receives the address of office Y in the form of numerical directory signals sent from originating register 23. This address was received, as application No. 2 information from the translator by register 23.

In the example shown in the drawing of FIG. 2, we know that office X had previously found that it could not use trunk group No. 4 and had sent this information, in advance, to offices W, Y, and X via the status network. (Otherwise, the program at office W would have used the preferred route 1'). If, at this time, a busy or "no-go" signal is received from path selector 35 by register 33, indicating that no trunks in route 3 are truly available in spite of an indication to the contrary at office W several milliseconds previously, then register 33 sends a NO GO signal to register 23 and then releases from the connection. The register 24 releases the forward connection 29, 28 and 31 and then makes a first application to the translator 26 for an alternate route. On the other hand, if a trunk is available in group 3, the path selector 35 sets up a connection across a switching matrix 36 to seize an outgoing trunk 37. The register 33 is then released and made available to service other calls. The short holding time of the transit mode should be noted. A confirmation signal is returned to office W from incoming trunk circuit 38 in office Y.

Register-sender 24 responds to the trunk confirmation signal and makes application No. 3 to the translator 26. The translator reads out that part of the directory number which is the address of office Z. Since this is the last office in the route, the program is arranged to include on this application a signal indicating "last application."

If successful in obtaining office Z, the register translator association is now completed for this call.

At office Y, path selector 39 connects an available register 41 in the transmit mode to incoming trunk circuit 38 via a register access matrix 42. The register-sender 41 sends a signal, such as a wink signal (comparable to dial tone) to the originating register-sender 23. The register 23 then sends out the address digits of office Z to transit register 41.

In an exactly similar manner as described above for office X responsive to the receipt of the directory numbers of office Z from the register 41, the path selector indicates whether the desired programmed route is or is not available. If the desired trunk is available, the path selector 39 sets up a connection across the switching matrix 43 to an outgoing trunk 44 and register 41 is released.

The detection of a calling condition in incoming trunk circuit 46 causes path selector 47 to select an available register 48, again through a register access matrix 47.

As described above, the trunk confirmation signal from trunk 46 is received by register 24 in the originating office W. The register 24 does not make application to the translator 26 since it receives a "last application" signal. The originating register-sender 24 therefore waits for the signal from register 48 and then sends the signals representing the directory numbers which were received from station A and are unique to the called station B.

The desired circuit 51 is seized via a matrix switch 52, and the call is completed to the call line using well known techniques of common control exchanges. The register 48 (an all ancillary equipment) is dropped out after cut-through.

At this point, the register 24 may release from the connection or it may perform various functions in combination with the called station B prior to releasing from the connection. As an example, if the system is for switching of 100 word per minute teleprinter stations using A.S.C.I.I. codes the register 24 may be programmed to automatically challenge the automatic answer back device on the teleprinter at station B by sending the A.S.C.I.I. code digit known as "WRU." In this way, it can be verified that office Z selected the correct subscriber terminal.

This is important since the use of this invention with such a check of having reached the correct distant party permits the establishment of a system where originating subscriber instruments can be unattended. This allows the traffic to be spread more evenly over a 24 hour period thus reducing the number of trunks necessary to support the system.

Communications are now established between station A and station B over the second alternate route 3'. Conversation follows.

The originating register 23 control system is faster in completing connections if networks status information is fed into the programmer 27. With the status information, the programmer 27 may skip over unavailable routes and proceed immediately to the routes that are available. Therefore, a call will rarely encounter conditions of unavailability and have to resort to exploring.

The network status information system is shown on FIG. 2 by means of lightly inked lines representing the status information channels, such as channel 53, extending between data processors 54, 55 in the offices W and X. These processors are memory stores which receive signals indicating the status of the equipment at every office. They also transmit signals indicating the status of the equipment at the office where they are located. One example of such a network for transmitting and processing status information is described in a co-pending patent entitled "Network Status Intelligence Acquisition, Assessment and Communication," U.S. Pat. No. 3,411,-140, by Halina, Haigh, and Litchman and assigned to the assignee of this invention.

When assembled as shown in FIG. 6, FIGS. 3, 4 and 5 schematically show those portions of office W which are necessary for a complete understanding of the invention.

FIG. 3 shows a plurality of subscriber stations including station A. These stations may be selectively connected via matrices 23 and 29 to any one of the trunk circuits 56, one of which may be the trunk circuit 28 which also appears in FIG. 2.

The trunk circuits 56 shown in FIG. 3, are those of trunk group No. 1 leading from office W to office X. It should be understood that another trunk group No. 2 leading to office Y also emanates from office W, but it is not shown in FIG. 3 to avoid unduly complicating the drawing. Each of the trunk circuits 56 show only those components which are necessary for an understanding of this invention. The remaining portions (not shown) of these trunk circuits may take any known form.

Common to all of the trunk circuits 56 are network status indicating equipment, network status processor 54 (FIG. 3). Associated with this equipment are parts of all trunks busy indicating devices, as at 58.

Since the system here illustrated distinguishes between different classes of subscribers, there are shown high priority and low priority all trunk busy indicating devices.

As explained above, it is necessary to guard against "pocketed" calls; that is, more than one call attempting to use the last available trunk in a group. If this should happen, the exploring mode of the originating register will ensure that the call is not lost altogether but is merely delayed. To keep these delays to a minimum the low priority all trunks busy information sent to other offices is derived from a percentage all trunks busy circuit 60 (FIG. 3). In this way, the distant offices are informed that the trunk group is all busy when in fact, a certain percentage of the trunks are free. This allows more than one call to be completed by the group in the transit delay time that it takes to update all the distant office network status memories. The number of trunks still free is adjustable in the circuit 60, to suit the trunk group size and the statistical chance that a pocketed call will occur.

However, the local translator program is driven from the 100% all trunks busy signal so that the remaining trunks in the group will receive traffic originating in the local office where the status information is being generated.

As shown in FIG. 3, the network status processors 54 are associated with transceiving channels NEW, and S for transmitting status information north, east, south and west (to offices X, Y, and Z in our example). This circuitry assembles the status information relative to office W equipment for transmittal in serial form and receives status information in serial form from other offices in the system.

It is important to note that the status channels, over which this information passes, do not necessarily connect to every other office in the network. As shown in our example, in FIG. 2, there is no direct status channel from office W to office Z. It is part of the job of the network status processors at offices X and Y to pass on to Z status changes in the network received from W and vice-versa. It can be seen that this data transfer occupies some finite time, hence the need for the percentage busy circuit on the low priority all trunks busy.

In the example to be discussed below it is assumed that a two priority system is in use on the trunks, however, the system is equally applicable to multi-priority levels by sending more data between offices.

In the example, two bits of information are needed per trunk group to describe its status. One bit indicates that all trunks in the group are busy with traffic and at least one is carrying low priority traffic and, therefore, may be pre-empted by high priority traffic. The other bit indicates that the trunk group is unusable by high or low priority traffic.

The first bit signal is derived from a conventional (100%) All Trunk Busy (A.T.B.) parallel chain circuit for use by the local translator. The first bit signal is alternately derived from the percentage all trunks busy circuit 60 for use by other offices.

The second bit is derived from a second conventional A.T.B. chain activated only when all trunks (100%) are in use by the highest priority. It may also be activated from the carrier failure alarm for the respective trunk group. This bit feeds both the local translator program 27 and the rest of the network.

It is the job of the network status processors to receive information from other offices, store it and make it available to the local translator, and transmit it onwards to each office to which status channels are connected. The processors must also rapidly suppress and correct out of date or false data. One way that this may be accomplished is by allowing a data message concerning a status change on a trunk group to be generated by the originating office and sent to all other offices where it is stored for local use and then retransmitted back to be eventually received by the originator. If the received message corresponds to the correct status the originator remains quiescent. If it indicates an error in status for any of the trunk groups under the control of the originator, a corrective message is generated and sent to all other offices at once.

One method of simplifying data messages is to transmit a bit stream indicating the status of the entire memory store preceded by a synchronizing header and followed by an end of message character *s*. This message contains all information about locally monitored trunk groups and all information received from other centers on previously received messages. It, therefore, automatically returns the latter information to originating centers for checking. This entire message is sent by the processor, in all directions simultaneously, whenever any change in the memory status is detected or at least cyclically once per minimum period (say 1 minute). In this way, when a status message comes in which contains a change in status it will be automatically retransmitted in a fan out pattern to all other centers provided that the change is not an error which is to be suppressed as described above. In this way, messages will rapidly fan out and propagate to the furthest switching center in the network.

Different portions of the originating register 23 are shown in FIGS. 3–5 as convenient. This is the originating register which sends the directing signals to the other offices. Also illustrated are the portions of translator 26 and programmer 27 necessary to an understanding of the invention.

More specifically, FIG. 3 shows typical outgoing trunk circuits 28, associated with a switching center, such as office W. Connected to these trunk circuits via matrix 23, originating link 22 and matrix 29 are a plurality of subscriber stations A–N. Associated with each of these trunk circuits is a trunk line; for example, trunk circuit 28 is associated with trunk line 59. Each trunk circuit comprises the well known line or A relay (such as relay K30) which operates responsive to seizure, as when a contact is closed across tip and ring conductors.

Responsive to the operation of the line relay K30, normally open contacts K31 close. The closure of contacts K31 establishes an operate path for the well known slow-to-release B or hold relay K40.

Normally open contacts K41 close responsive to the operation of relay K40. The resulting closure of contacts K41 sends back a signal on the sleeve leads indicating that the trunk circuit 28 has been seized, marking it busy to other calls, and perhaps also holding other equipment operated.

Normally closed contacts K42, K43 are opened to break one set of "OR" gate inputs which lead to low priority all trunks busy (100%) relay K70 and to the low priority percentage all trunk busy (ATB) circuit 60 and relay K90 respectively.

In the priority system to be described below, whenever a call is set up through matrix 29 using a trunk 28 the memory of the priority of the call is stored in the trunk for the duration of the call for use during subsequent busy testing to determine if the trunk may be pre-empted by a higher priority call. In the 2 level priority system under discussion, relay K50 in the trunk 28 is this memory. If the call is high priority, the path selectors 25, 35, 39 in FIG. 2 operate the H.P. relay K50 over one coil during the setting up of the matrix connection. Relay K50 holds for the duration of the call under control of B relay K40 by the hold circuit extending through normally open contacts K44 and K51. Normally closed contact K52 opens to break an OR gate input to high priority all trunks busy relay K80.

It should be noted that, upon becoming busy, each trunk circuit in group 56 breaks one of the parallel paths when contacts corresponding to K42, K43 or K52 open. When the last of the parallel contacts corresponding to K42 or K52 open, a normally operated ATB relay K70, or K80, respectively releases to make contacts K71 or K81 and thereby signal a low or a high priority, 100% all trunks busy condition to the network status processor.

When a specified integral number of contact corresponding to K43 open, the voltage comparator circuit 60 associated with trunk group 56 toggles over causing the release of relay K90. Contact K91 closes thereby signalling a low priority percentage busy condition to the network status processor.

The network status processor 54 passes the signals from contacts K71 and K81 directly to the translator program 27 and transmits the signals from contacts K81 and K91 to other offices.

The carrier fail alarm signal from trunk group number 1 causes the release of relay K60 when an alarm condition exists corresponding to the Nonusability of the trunk group transmission path. Contact K61 opens and releases relay K80 thereby signalling all translators that the group is unusable.

Similarly, a power failure in trunk circuit 28 releases relay KPF opening the contacts KPF1, KPF2 and KPF3 in series with contacts K52, K42 and K43.

Thus, if all other trunks are busy, failure of power in trunk 28 or removal of the trunk from its plug-in position will signal all trunks busy.

The high priority all trunks busy relay K80 normally is and remains operated until all of the trunk lines in the associated trunk group are busy with high priority traffic; then, it releases. Therefore, the break contacts K81 are normally open as long as any trunk is available for high priority traffic because relay K80 is then operated.

The low priority ATB circuit includes parallel contacts, one in every trunk circuit corresponding to K43. Each trunk circuit becoming busy breaks one of these parallel circuits. When a certain percentage of the parallel contacts K43 have been broken, relay K90 then releases to make contacts K91 and thereby signal a low priority all trunks busy condition to the network status processor 54.

The low priority all trunks busy relay K90 normally is and remains operated until a fixed percent of the trunk lines of the associated trunk group are busy. The trunks beyond this percentage are then reserved for locally generated calls controlled by contact K71. Normally closed contacts K91 remain open as long as relay K90 is operated, thereby indicating the availability of the group to distant offices.

As a group becomes busy contact K91 will always close before contact K71. When all trunks are busy relay K70 releases and the ground signal from K71 passes through the network status processor 54 via diode D3 to vertical 71 on the program 27 (FIG. 4).

Similarly, when relay K80 releases the ground signal from K81 passes to the network status processor 54 where it is transmitted to other offices and allowed to pass via diode D4 to vertical 71*a* on the program 27.

Means are provided in the processor 54 for sending low priority all trunks busy signal from K91 through the network status information system when a certain percentage of the trunks in group No. 1 are busy. That is, the percentage busy relay K90 releases when a certain percentage of the trunk lines in a trunk group No. 1 are busy. For example, when each of the B or hold relays K40 of the trunk circuits 56 is not operated, a resistance ground potential is transmitted through contacts (such as contacts K43) from a ground source via a resistor such as resistor R10. The other side of each resistor R10 is connected to the base of a transistor Q10. When a certain percentage of the trunk circuits are in use, the total resistance of those of resistors R10 in each of the trunks 28 which are connected in parallel assumes a known value. This known value is utilized by a transistorized comparison circuit 60 to release a relay such as relay K90.

Thus, when a certain percentage of the trunk lines in trunk group No. 1 are busy, the low priority, all trunk busy relay K90 releases and an ATB–L signal is forwarded to the network status processor.

In greater detail, when a certain number of trunks are busied, the ratio of the value of the voltage drop of the parallel resistors (such as R10) as compared to the reference voltage at point 11 as set by potentiometer P11 is of a value which enables current to flow through transistor Q11 rather than through transistor Q10. Both transistors share a common emitter resistor R14 and have separate load resistors R15, R16, respectively. Current flow through transistor Q11 places a ground potential on the input of amplifier A11. This ground potential is amplified to release relay K90. Responsive thereto, relay K90 operates normally closed contacts K91.

The closing of contacts K91 connects the ground for the low priority ATB–L signal, sending a ground to the "Network Status Processor 54" for transmission of status information over the north, east, south and west status transmission channels 53 to the various distant offices. The "Network Status Processor 54" associated with this office W also receives similar high and low priority status information from its associated office. They function to send such information, as taught by the above identified Halina et al. copending application.

The status information so sent or received is used as shown in FIG. 4 to inhibit the selection of routes that are not available. This eliminates the necessity of uselessly trying the routes that can not be used. Thus, if trunk group No. 4, for example, is not available for low priority traffic, an inhibit ground signal is sent from the "Network Status Processor 54" over the conductor 72 (not shown in FIG. 4). This ground signal is derived from data which originated at office X and was transmitted over channel 53 FIG. 2.

FIG. 4 shows portions of the translator 26 and program 27 as designed to function in conjunction with the trunk circuits 56 and the register 24.

The calling station sends directory number signals which identify the called end point (station B, for example). After the register has stored a full complement of the called directory number signals, it calls in the translator 26. The translator then returns the translated directory number address by address as the path progresses through the network.

The program 27 (FIG. 4) comprises a coordinate array of horizontal buses 73 and vertical buses 74. The horizontal buses represent alternative routes. The vertical buses represent transmission facilities required to complete the routes, class of service restrictions or pick out chain. For example, bus 76 represents route 1′ of FIG. 1 and buses 71 and 71*a* represent trunk group No. 1. The horizontal buses are divided into two groups, the top group 77 is used for example, for low priority callers, and the lower group 78 is used for high priority callers. Diodes are selectively connected across the intersections of vertical and horizontal buses according to the equipment required to complete the individual routes. For example, the diode D11 is connected across the intersection of uppermost horizontal bus 76 which represents the preferred route 1′ as shown by the marking at the left-hand end, and the low priority vertical bus 71 which represents the low priority trunk group No. 1.

A study of FIG. 1 discloses that the preferred route 1′ includes the trunk groups No. 1, 4. Thus, diodes D11, D12 connect the horizontal 76 to the first and fourth vertical buses 71, 75. In like manner, the second preference route 2′ includes trunks 2 and 5, therefore, the second horizontal bus 78 is diode connected to the second and fifth vertical buses 79, 80. An inspection and comparison of FIGS. 1 and 4 will disclose why the third horizontal bus is connected to the first, third, and fifth verticals while the fourth horizontal bus is connected to the second, third and fourth verticals.

Since each of the routes is represented by the first four horizontals 76, 78, 81, 82 and since each route extends between the same two end points W, Z in the network of FIG. 1, each route is the communication equivalent of the other; although, a preference selection makes a difference as to which is used. For this reason, the inputs to all four of these buses are strapped together at 83.

The system under description is a two priority system. For this reason four more rows of program 27 marked as 1″, 2″, 3″, 4″ are also connected to the inputs of the rows 1′, 2′, 3′, 4′ at 93. When a call is processed for office Z, an AND circuit 84 of the translator 26 applies a negative low impedance potential to all of the 8 program rows.

Simultaneously, the translator receives the class of service from the register and applies a ground potential to one of the high or low priority vertical 86 or 87. These rows are connected by diodes to the horizontals in such a way as to inhibit one set of rows. That is, a high priority call will ground vertical 86, inhibiting rows 77 (1′, 2′, 3′ and 4′) and thereby using the high priority program stored in rows 78 (1″, 2″, 3″, 4″). Low priority calls similarly inhibit rows 78 and use rows 77 (the low priority program). In this way, a selection of the correct program is made, corresponding to the class of service of the calls originator.

The above description and FIG 4 shows an embodiment of the principle, indicating the use of class of service for selection of translator programs for different priorities. It also depicts the same number of program rows and placement of program diodes for both low and high priority programs.

It is important to note that the principle is not limited to use for 2 priority levels, or for priority selection only. Neither need the rows and programs be identical.

As an example, the principle can be employed for selection of trunk switching programs for trunk channels of radically different bandwidths, i.e., 150 c.p.s. and 48 kc.p.s., each having 3 priority levels.

In this case, it can be expected that the resulting 6 programs will not be all identical due to the different routings of the carrier line plant.

Once the correct set of rows has been selected, (76, 78, 81 and 82 in our example) the negative potentials applied at 83 to the four dropping resistors such as R23 are acted upon by the inhibiting grounds on the verticals. The function which remains is to select between the routes 1′, 2′, 3′, and 4′ in the given order of preference. This is done by the route relays 88 and a preference pick chain as described below.

In greater detail, every horizontal in FIG. 4 is connected to an individually route relay via an isolating diode. Thus, for example, the first route relay K100 is connected to the horizontal 76 via diode D13. In like manner, the relays K110, K120, K130 are connected to the horizontal buses 78, 81, 82 via the diodes D14, D15, D16 respectively.

Some or all of these route relays may also be required and used in a different order of preference for some other routing program of Translator program 27. These other program rows will generally be activated by some other office code corresponding, for example, to the case when office Z is a tandem only center or a gateway center to another network and the code dialled corresponds to an office code or P.A.B.X. homing onto office Z.

This reuse of the route relays 88 greatly reduces the number of such relays required for a given office. However, to allow full flexibility their contacts cannot be used for controlling the order of preference of selection of routes.

This last task is assigned to Pick Chain 91 and the verticals 92 marked 1, 2, 3, 4 in FIG. 4.

Preference order of selection of route relays is accomplished by inserting diodes such as D21 at the intersection of the rows and verticals. If row 76 marked by vertical 1 via diode D21 is not inhibited by any other vertical, it will be selected in preference to row 78 marked by vertical 2. The manner in which this is accomplished is described below.

Each of the route relays 88 controls associated contacts. For example, relay K100 (FIG. 4) controls contacts K101 (FIG. 5) which enables the read out of the information for route 1′. Therefore, if relay K100 operates, for example, contacts K101*a* close a circuit to enable a read out of route 1′, and contacts 101*b* open to safeguard against false read outs if a program error has permitted the selection of multiple routes. The other route relays K110–K130 control contacts K111–K131, respectively, to perform similar functions. Each relay opens a break contact to inhibit read out of a later row and depends upon a non-opened contact of all earlier relays. This way, one route only is always read out.

Means are provided for interrogating the translator 27 to obtain the preferred route information. In greater detail, the register 24 receives and stores the calling station sent directory number selection signals which identify the destination of a desired communication path (e.g. these signals may be the directory number of called station B). The register connects itself to the translator 26 and transmits suitable signals in the form of potentials applied through an AND gate 84 to the strapping 83. Each input to this AND gate may represent a directory number digit as indicated by the letters U, T, H, T*h* (units, tens, hundreds, thousands). By the strapping at 83, a negative potential output from AND gate 84 is applied to all horizontals representing all possible routes from calling station A to the called station B. The resistors R23 provide a voltage dropping resistor to enable the inhibiting verticals to short circuit the route relay 88. If the call is a low priority call, a ground is placed on vertical 87 to prevent selection of routes 1″, 2″, 3″ or 4″.

If all four routes 1′, 2′, 3′, 4′, are available, a negative voltage appears on each of the horizontal buses 76, 78, 81, 82 to feed through the diodes D13, D14, D15, D16 toward the route relays 88. However, relay K100 is the only one of the route relays to operate because the pick chain 91 (FIG. 4) inhibits all except relay K100 in a manner explained below. When relay K100 operates contacts K101 are actuated and ground potential is applied to a read out bus 112 representing route 1′. Contacts K102 are opened so that this ground potential can not reach any other horizontal bus in FIG. 5.

Means responsive to network status information are provided for inhibiting the selection of a preferred route if it is unavailable. More particularly, this means comprises the vertical buses 74 (FIG. 4) and relays of the pick chain 91.

The vertical buses 74 are numbered 1–N corresponding to the trunk groups 1–5 in FIG. 1. Thus, for example, the non-availability of trunk group No. 1 is indicated by ground potential on the vertical bus 1. The letter "N" indicates that any number of routes may be represented in a similar manner.

Assume that route 1′ cannot be used because trunk group No. 1 is busy to low priority calls. Enough of the resistors such as resistor R10 are removed from the potential divider to trip comparison circuit 60. Relay K90 releases, closes contacts K91, and thereby signals other offices via the processor.

Also, as explained above, relay K70 is released by the opening of the last parallel chain contact such as K42. Contact K71, closing, applies a low impedance ground via diode D3 to vertical 71. The ground draws current via resistor R23 and diode D11 to clamp the horizontal 76 to ground and remove any operating potential for route relay K100. The same ground similarly clamps horizontal 81 to inhibit operation of route relay K120 since trunk group number 1 is also to be programmed for route 3′.

Thus it can be seen that the program is formed by a pattern of diodes to apply clamping grounds (from verticals corresponding to trunk group not available) to horizontals corresponding to all possible routes. These inhibiting grounds clamp the corresponding horizontal buses to ground and dissipate the battery potential received from AND gate over the resistors such as resistor R23.

It should be understood that the illustration of the translator in FIG. 4 does not show all of the horizontal and vertical buses actually used but merely shows a representative quantity in order to illustrate the inventive principle.

The pick chain 91 operation is shown in FIG. 4. Its function is to cause the route to be selected in the preassigned order of preference. That is, routes are selected according to the preference table shown in FIG. 1. The routes 1′, 2′, 3′, and 4′ are required to be explored in numerical order.

The pick chain 91 is associated with horizontal buses 73 by a number of vertical buses 92. Each of these vertical buses is connected to an individual one of the horizontal buses through a diode. For example, vertical bus 93 is connected to horizontal bus 76 through diode D21.

The battery potential received from the register AND gate 84 is transmitted over the horizontal buses 73, through the diodes such as diode D21, up the vertical buses 92 to operate a relay chain (pick chain 91) shown in block diagram form. The relay chain is connected so that a first preference relay operates. The operation of such a relay associated with bus 93, for example, prevents the operation of any of the other relays in the chain. The one of the relays which operates is always the lowest number and depends upon the conditions of availability and unavailability of trunk groups then existing. Again, the reasons why trunk groups are available or unavailable is irrelevant.

Responsive to the operation of any one of the relays in the pick chain 91, a relay K140 operates to close contacts K141. A set of contacts (not shown) closes in the pick chain 91 to transmit a ground potential to the register over a selected one of associated junction points 94 corresponding to operated pick chain relay and wire 93′. This ground causes the register to operate any suitable equipment for storing a memory of the route that has been selected. This is the route signature described above.

Each time that the register applies for routing information, it sends back a ground potential over the same junction point. It also operates a first try relay (not shown) which closes all of contacts 96 to indicate that this is the first attempt to complete a path. The ground from the register passes over the selected wire and through diodes D26, D27, D28, D29 to all vertical buses 92 except for selected bus 93. Thus, ground on these verticals marks the horizontal buses 78, 81, and 82, and all horizontal buses representing the available routes are clamped to ground except for the route 1′ bus 76 going to the first preferred route relay K100. Relay K100 operates from the negative battery applied to strap 83, but relays K110–K130 do not operate because each side of their windings is grounded.

FIG. 5 shows that part of the program which converts the selected route to the codes representing the addresses of the tandem offices. Each horizontal bus represents a different one of the routes 1′–4′, as numbered at the right-hand end of the horizontal buses. The vertical buses are grouped according to the codes required for each application. Thus, a "First Application" group of verticals has diodes on a first horizontal programmed to read out code combinations which is the address of office X. The first application diodes on the second horizontal bus are programmed to read out the address of office Y. Likewise, the second application verticals are programmed with the address of office Z on the first and second horizontals. A study of the table in FIG. 1 will tell what is programmed in FIG. 5.

The vertical lines identify the last application required to complete any given route. Routes 1′ and 2′ have diodes for giving read out during two applications. This is shown here because two tandem offices are used in route 1′ in FIG. 1. Thus, diodes connect the first and second horizontal buses to line LA in the second application verticals. Since routes 3′ 4′ require three applications, the third and fourth buses are diode marked by coupling to the LA bus in the third application group of verticals.

The register begins by resetting an application counter 100 in the register by applying a potential to reset terminal 101. On the first step, the counter 100 in the register by applying a potential to reset terminal 101. On the first step, the counter 100 operates relay K150 in the translator over bus wires to close contacts K151 and thereby read out the code programmed on a "First Application" set of verticals. Thereafter prior to reapplication to the translator the counter 100 steps to the next step. This causes it to operate relay K160 on the second application and close contacts K161 for reading out the "Second Application" program of codes. Similarly, relay K170 operates on the third counter step to close contacts K171 and read out the third application. The principle is not limited to three applications of course.

When relay K100, for example, operates on the first application, ground potential passes through contact K101, diodes D31, D32, D33 and the vertical buses of the "First Application" group, contacts K151 to the tens and units stores 102, 103 in the register-sender 24. Thus, a tens digit is stored at 102 in perhaps a two-out-of-five code. Likewise, a units digit is stored at 103 in a similar manner.

The numbers stored in the tens and units circuit 102, 103 of the register are used to direct path selector 30 (FIG. 1) to operate the switching network 29 to seize a free trunk circuit 28 in trunk group 1 (01) leading to the tandem office X. If a busy, or "no-go" signal is returned from the tandem office X, it will be before FIG. 5 has read out a marked LA bus. Thus, the receipt of a busy signal before an LA signal causes a second try relay (not shown) to operate the contacts 97 instead of the first try contacts 96. Also a potential at 101 resets the application counter. Ground from the register goes through contacts 97 (FIG. 4), diode D51, to ground the route 1' bus 76 and inhibits relay K100. None of the other route relays 88 are inhibited so that battery is applied to all routing relays except relay K100. The operation of relay K110 causes contacts K112 to remove ground from the contacts of the route relays K120, K130 while contacts K111 ground the second horizontal bus in FIG. 5. The address of the offices in the route 2' are now read out until a last application signal is received. However, if a busy signal is received before an LA signal is reached, the process repeats and route 3' is explored.

When a last application signal is received by the register, relay K180 operates in the register and no more translator applications are made.

Briefly in resume, only the originating office register is busied throughout the entire search for a path through the system. If a "go" signal is returned, the application counter merely steps to its next position to operate the next application relay K150–K170 causing another set of tens and units digits to be stored at stores 102, 103 for transmission to set a switching network in a distant office. Whenever a busy or "no-go" signal is returned from a distant office to register 24 before an LA marking is reached, the signal causes the register to signal the translator and cause the translator to send a ground through a different set of contacts such as contacts 97. The busy signal also causes a signal to be set to reset the application counter 100 (FIG. 5) to its first application position. Thereafter all routes having a preference higher than the explored routes are inhibited. The call thereafter proceeds as before, but now it attempts to complete the connection over the next lower preference route. This procedure continues until a last application signal is encountered to indicate that the call has reached the called station.

In operation, when station A (FIG. 2) goes off-hook, it is connected through a switching matrix 23 to a link circuit 22. A register 24 is connected into the circuit to receive and store the called station directory number signals. The register 24 calls in the translator 26 for a determination of the route to be used. Since the called station B is associated with office Z, the AND gate 84 is used and the class of service conveys whether the calling station has a high or low priority. A high priority call is handled analogously to the low priority call described herein except that it utilizes the horizontal buses marked 1'', 2'', 3'', 4'', 5'' in FIG. 4.

In the exemplary system described herein, the gate 84 supplied battery potential to horizontals 76, 78, 81, 82 which are tied together at 83. This battery potential on bus 83 passes through diode D21 to vertical 93 to the pick chain 91 where a "first" relay (not shown) operates. Responsive thereto, a signal is sent to the register through contact K141 to indicate the highest preference route that is available. The register 24 causes the closing of the first try contact 96 in the translator. Then the register sends a ground through the junction point 94 that was selected by the pick chain, contacts 96, diodes D26, D27, D28, D29, vertical buses 92, and diodes D14–D16 to the route relays 88. Since no inhibiting ground appears on one horizontal bus (such as 76) a particular route relay (such as K100) operates.

Responsive to the operation of a route relay, ground passes through contacts (such as contacts K101) and is prevented from going through the contacts of the other route relays by the opening of break contacts such contacts K102. The ground that passes contact K102 goes over the route 1' horizontal bus to the "First Application" tens and units vertical buses. At this time, application counter 100 in the register is on position 1 and relay K150 is operated, closing contacts K151.

The closing of contacts K151 enables the ground from the horizontal bus to pass through the diodes D31, D32, D33 and the tens and units vertical buses to the tens and units stores 102, 103 in the register. The translator is released between applications. Then, these stored digits are fed to the path selector to control a connection through a switching matrix for extending the call to the next tandem office. In route 1', the next tandem office is the office reached over trunk group No. 1. On the second application the counter 100 in the register is set to position 2 and closes relay K161 and the address of office Z is read out to be stored in 102, 103. The register sends this information to office X to set crosspoints there.

If, at this point, a busy signal is received from office X indicating that trunk group No. 4 is unavailable, a busy signal causes ground to be applied through contacts 97, diode D51, vertical bus 93 and diode D21. The busy signal also causes application counter 100 to be reset to its first application position. At this time, route 2' is selected.

Here again, if route 2' encounters a busy condition, the call is transferred to route 3' when routing relay K110 releases and relay K120 operates. Again, on its first application, the register receives signals sent from bus 3' to the tens and units stores 102, 103 in the above described manner. These signals direct the path selector 30 to switch through from office W to office X. On the second application, the tens and units store circuits 102, 103 receive the address of office Y. This address is sent to office X by the register. The path selector 35 operates the network 36 to seize trunk circuit 37.

The application counter 100 then switches to a third application position. When the third relay K170 is operated, contacts K171 close to read out the address of office Z which is sent to office Y by the register. The path selector 39 operates switching network 43 to seize outgoing trunk 44. At this point, a last application vertical bus was also marked via diode D55 to operate relay K180 and notify the register that this is the last application and that the tandem trunking part of the call is completed. At this time, the register sends the local directory number to office Y and path selector 49 and the call is completed to the called subscriber. When the call is cut through, register sender 24 may be dropped out.

While the principles of the invention have been described above in connection with specific apparatus and applications, it is to be understood that this description is made only by way of example and not as a limitation on the scope of the invention.

I claim:

1. A switching network comprising a plurality of widely distributed switching centers, each of said centers including switching means for extending connections through the center where the switching means is located, register means in the center where a call originates for controlling the extension of calls through selected routes comprising a plurality of said centers connected in tandem, programmer means associated with the originating office for directing the register by sequentially reading out the addresses of each tandem connected center, said read-out being made as the call progresses, center by center in a preferred sequence, means for exploring alternate routes connecting said centers in tandem in a predetermined order of preference, means for precluding the extension of connections over closed loops. means for discriminating between high and low priority calls, and means for barring further extension of low priority calls after a certain percentage of said switching network is in use.

2. The network of claim 1 and means for sending into said network a low priority, all trunks busy condition signal when said certain percentage of equipment is busy, and a high priority, all trunks busy condition signal when an entire path from one of said centers to another of said centers is busy with high priority traffic or out of service, and network status information means operated responsive to said all trunks busy signal for barring access to certain parts of said network on a high and low priority basis.

3. The network of claim 4, including network status information means located at said centers for determining and transmitting status information at the center of its location and for receiving the status information regarding all of the other of said centers, and means responsive to the status information received at said originating center for changing the preferred sequence of said programmer means.

4. The network of claim 3 wherein said status information includes first signals signifying all trunks busy to low priority calls and second signals signifying all trunks busy to high priority calls, and means for generating said first and said second signals.

5. The network of claim 4 wherein said signal generating means for generating said first signal comprises a first parallel chain circuit, and transistorized bridge means operated when a certain percentage of the trunks are busy to operate the said first parallel chain circuit.

6. The network of claim 5 wherein said signal generating means for generating said second signal comprises a second parallel chain circuit, and means for operating said second chain circuit responsive to an all trunks busy or unavailable condition.

7. A switching network for interconnecting calling and called stations, said network comprisig a plurality of widely distributed switching centers, stations associated with at least two of said centers, line means for connecting said stations to said centers, trunk means for providing alternate call paths interconnecting said centers, switch means at each of said centers for interconnecting incoming ones of said trunks or said lines with outgoing ones of said trunks or said lines, originating register means at the center having a calling station connected thereto for controlling the said switch means to interconnect said centers in tandem, center by center, control means at each of said centers for controlling the switching means as its center under the control of the originating register, and means for recognizing and serving different classes of calls.

8. The switching network of claim 7 including means for transferring specific routing information from said originating register to said control means at preferred succeeding ones of said centers, and means associated with said originating register for transferring said specific routing information to an alternate one of said centers responsive to receiving a signal indicating non-availability from said preferred succeeding center.

9. The switching network of claim 8 and program control means at said originating center for controlling said register to select said centers alternately according to a definite program.

10. The switching network of claim 9 including means in said centers for continuously monitoring the traffic and equipment status to obtain current traffic and equipment status information when it occurs in said centers, and means for broadcasting said monitored traffic and equipment status information to other switching centers throughout the network.

11. The switching network of claim 10 and means for automatically altering said definite program responsive to monitored traffic and equipment status information received at the calling station center.

12. The switching network of claim 11 wherein means are provided at said centers for combining locally derived monitored traffic and equipment status information with said received monitored traffic and equipment status information for broadcasting said combined information to other centers.

13. The switching network of claim 12 including means at said centers for checking said received monitored traffic and equipment status information for accuracy, and means at said centers for suppressing incorrect monitored traffic and equipment status information.

14. The switching network of claim 7 wherein means are provided for causing said originating register to transmit only sufficient information to each serially newly connected center to direct connection to the next programmed center.

15. The network of claim 7 wherein said originating register includes means for storing a program identifying a plurality of different routes for interconnecting said centers, said program excluding closed loop whereby switching paths are precluded from circling back upon themselves.

16. The network of claim 7 and means at said originating register for monitoring the completion of the connection between said calling and called station, unattended means at the called station, and means responsive to said monitoring means for transmitting data from said calling station to said unattended means after said connection is completed.

17. The network of claim 7 and adjustable means for giving a signal when a predetermined number of said trunks or lines in any given route are busy, and means responsive to said signal for barring access to those of said routes after said predetermined percentage of the trunks or lines in that barred route become busy, whereby said adjustment of said signal giving means selects the percentage of trunks which remain idle to certain calls when said access is barred.

References Cited

UNITED STATES PATENTS

| | | |
|---|---|---|
| 2,421,919 | 6/1947 | Avery. |
| 2,557,388 | 6/1951 | Molnar. |
| 3,111,559 | 11/1963 | Jacobaeus et al. |
| 3,155,775 | 11/1964 | Zarouni. |
| 3,231,676 | 1/1966 | Carlström et al. |
| 3,309,467 | 3/1967 | Gorgas et al. |

KATHLEEN H. CLAFFY, Primary Examiner

T. W. BROWN, Assistant Examiner